US009976889B1

(12) United States Patent
Reinshaus et al.

(10) Patent No.: US 9,976,889 B1
(45) Date of Patent: May 22, 2018

(54) METHOD OF ASSEMBLING A TUNING FORK OR A CORIOLIS MASS FLOWMETER, PRODUCT AND INTERMEDIATE PRODUCT OF THIS METHOD

(71) Applicant: ROTA YOKOGAWA GMBH & CO. KG, Wehr (DE)

(72) Inventors: Peter Reinshaus, Kuessaberg (DE); Stefan Schubach, Wehr (DE); Matthias Amann, Grafenhausen (DE); Martin Ricken, Bad Saeckingen (DE)

(73) Assignee: ROTA YOKOGAWA GMBH & CO. KG, Wehr (DE)

( * ) Notice: Subject to any disclaimer, the term of this patent is extended or adjusted under 35 U.S.C. 154(b) by 0 days. days.

(21) Appl. No.: 15/357,405

(22) Filed: Nov. 21, 2016

(51) Int. Cl.
*G01F 1/84* (2006.01)

(52) U.S. Cl.
CPC .......... *G01F 1/8404* (2013.01); *G01F 1/8477* (2013.01)

(58) Field of Classification Search
CPC ....................................................... G01F 1/84
See application file for complete search history.

(56) References Cited

U.S. PATENT DOCUMENTS

| | | | |
|---|---|---|---|
| 4,781,069 A | 11/1988 | Mitzner | |
| 5,301,557 A | 4/1994 | Cage et al. | |
| 5,602,345 A | 2/1997 | Wenger et al. | |
| 8,573,067 B2* | 11/2013 | Lanham | G01F 1/8418 73/861.355 |
| 8,931,354 B2 | 1/2015 | Ricken et al. | |
| 9,194,731 B2* | 11/2015 | Chatzikonstantinou | G01F 1/8477 |
| 9,200,937 B2* | 12/2015 | Werbach | G01F 1/8404 |
| 2016/0069719 A1* | 3/2016 | Lanham | G01F 1/8409 73/272 R |

* cited by examiner

*Primary Examiner* — Jewel V Dowtin
(74) *Attorney, Agent, or Firm* — Grossman, Tucker, Perreault & Pfleger, PLLC

(57) ABSTRACT

A tuning fork, particularly for a Coriolis mass flowmeter, and method of assembly comprising providing a first and a second measuring tube; providing a driver holder per measuring tube; providing at least one sensor holder per measuring tube; providing a first bracket part and fixing it to opposing portions of said first and second measuring tube such that said bracket part forms a bridge between said measuring tubes at positions corresponding to said driver holders; providing at least one second bracket part and fixing it to opposing portions of said first and second measuring tube such that said second bracket part forms a bridge between said measuring tubes at positions corresponding to said sensor holders; fixing at least one additional part of the tuning fork to the bracketed measuring tubes; severing said first bracket part; and severing said second bracket part. The disclosure additionally provides a tuning fork pre-stage.

23 Claims, 3 Drawing Sheets

METHOD OF ASSEMBLING A TUNING FORK OR A CORIOLIS MASS FLOWMETER, PRODUCT AND INTERMEDIATE PRODUCT OF THIS METHOD

FIELD OF THE INVENTION

The present invention relates to a method of assembling a tuning fork of a Coriolis mass flowmeter, a tuning fork pre-stage and a tuning fork obtainable by said method as well as a Coriolis mass flowmeter comprising said tuning fork.

BACKGROUND

Flowmeters are used to determine the mass flow rate of a fluid flowing through a tube. Coriolis mass flowmeters use the vibration pattern of two measuring tubes arranged in parallel for this purpose. An electro-dynamical driving system is normally used to excite the measuring tubes at one of their resonance frequencies. Sensors, usually also electro-dynamical sensors, measure the vibration of the measuring tubes. Typically, at least two pairs of sensors distributed over the length of the measuring tubes are used for this purpose. The measuring tubes may be straight tubes, such as disclosed in U.S. Pat. No. 5,602,345 A, loop-like tubes, as described in U.S. Pat. No. 4,781,069 A, or U-shaped measuring tubes, such as disclosed in U.S. Pat. No. 5,301,557 A, U.S. Pat. No. 8,931,354 A or U.S. Pat. No. 9,194,731 B2. The measuring tubes are solidly mounted on a support at their inlet and outlet ends. During use, the measuring tubes are oscillated about axes which are located adjacent to the solid mounting points. So-called node plates are often fixed in the region of these axes in order to additionally stabilize the measuring tubes and to make sure that the generated Coriolis forces in the measuring tubes are substantially linear spring forces. At the ends of the measuring tubes a flow divider and, respectively, a flow combiner are attached so that the flowmeter can be mounted to an inlet and an outlet pipe.

The assembly comprising the measuring tubes, supports, flow divider and flow combiner, carriers for the sensors and the driver units and optional node plates is often referred to as the tuning fork of a flowmeter. The components of the tuning fork are normally fixed to each other by high-temperature brazing. It is crucial during the brazing steps that the components of the tuning fork are exactly fixed and held in their correct positions in order to avoid any deformation due to thermal expansion and contraction during the brazing process. Complicated and expensive brazing tools are generally used for this purpose. The brazing tool has to be exactly adapted to the specific tuning fork and can normally not be used for any other type of tuning fork. The brazing tool is slightly deformed and worn off with each use and degrades so that it can be used only a limited number of times. This makes the brazing process and the production of the tuning fork rather expensive. Even if the brazing tool is formed of a material with a very high thermal stability this does not really solve the problems. First of all, the brazing tool is more expensive and, second, has the additional disadvantage that its coefficient of thermal expansion does not match with the materials used for the components of the tuning fork. As a result, deformations of the tuning fork components during brazing are experienced.

SUMMARY

The present invention was made in order to solve the problems of the prior art. It is thus an object of the present invention to devise a method of assembling a tuning fork of a Coriolis mass flowmeter which can be easily performed in a cost-effective manner without causing deformation of the components of the tuning fork. Another object is to devise a pre-stage of the tuning fork for use in said method and a tuning fork and a Coriolis mass flow meter resulting from said method.

In a first aspect, the invention thus relates to a method of assembling a tuning fork of a Coriolis mass flowmeter, the completed tuning fork comprising:

a first and a second measuring tube running at least partly essentially parallel to each other;

a driver holder per measuring tube which is attached to a respective one of the measuring tubes and which is adapted to hold a driver unit in a position suitable to induce oscillation of the respective measuring tube;

at least one sensor holder per measuring tube which is attached to a respective one of the measuring tubes and which is adapted to hold a sensor in a position suitable to detect oscillation of the respective measuring tube;

the method comprising the steps of:

providing a first bracket part and fixing it to opposing portions of said first and second measuring tube such that said bracket part forms a bridge between said measuring tubes at positions corresponding to the positions of said driver holders in the completed tuning fork;

providing at least one second bracket part and fixing it to opposing portions of said first and second measuring tube such that said second bracket part forms a bridge between said measuring tubes at positions corresponding to the positions of said sensor holders in the completed tuning fork;

fixing at least one additional part of the tuning fork to the bracketed measuring tubes;

severing said first bracket part and forming a gap in a region between said first and second measuring tube; and severing said second bracket part and forming a gap in a region between said first and second measuring tube.

The main idea of the invention resides in the use of bracket parts which each form a bridge between the measuring tubes and thus stabilize the measuring tubes with respect to each other during the brazing process which is preferably used to fix at least one additional part of the tuning fork to the bracketed measuring tubes. The bracket parts not only serve to fix the measuring tubes during the brazing process but remain in the completed tuning fork, after having been severed, as carriers for the driver units and sensors, respectively. There is therefore no need for the brazing tool to hold the carriers for the driver units and the sensors during the brazing process. The brazing tool can thus be made much less complicated than the brazing tools of the prior art.

In order to reduce deformations during the brazing step to a minimum the bracket parts are preferably made from the same material as the measuring tubes. Consequently, the bracket parts and the measuring tubes have the same coefficient of thermal expansion and thus show the same expansion behavior when heated. In a preferred embodiment, the bracket parts are made from metal, preferably steel. They are expediently fixed to the measuring tubes by welding, particularly by spot welding. It is also possible to only preliminarily fix the bracket parts by welding and ultimately attach them by brazing during the brazing process. As already mentioned, the bracket parts are not only used to fix the measuring tubes during the brazing process but they remain in the completed tuning fork as carriers for the driver units and sensors. Accordingly, the bracket parts are attached to portions of the measuring tubes in positions where, in the final tuning fork, a sensor or a driver unit is to be located. Further use of the severed bracket parts as carriers for the sensors and driver units makes additional fixation steps of the carriers superfluous and thus greatly simplifies the assembling process of the tuning fork.

The form of the bracket parts can principally be freely chosen in accordance with the desired purpose, which is to connect both measuring tubes and form a bridge between them and to act as a carrier for a sensor or a driver unit. It is also possible to additionally use the bracket part as a carrier for other components of the tuning fork in addition to a sensor or driver unit. Accordingly, the bracket part is provided with at least one additional fastening portion. This additional fastening portion may, for example, serve as a cable holder or the like. The form of the bracket parts may also be designed with regard to the counterbalancing of masses and the moment of inertia of the measuring tubes in the final tuning fork. It is particularly preferred that the first and second bracket parts are formed identically as this reduces the number of different parts and minimizes manufacturing costs.

After having fixed the bracket parts to the measuring tubes a tuning fork pre-stage of the present invention is obtained. Said tuning fork pre-stage comprises a first and a second measuring tube running at least partly essentially parallel to each other; a first bracket part which is fixed to opposing portions of said first and second measuring tube such that said bracket part forms a bridge between said measuring tubes at positions corresponding to positions of drive unit carriers in a completed tuning fork; and at least one second bracket part which is fixed to opposing portions of said first and second measuring tube such that said second bracket part forms a bridge between said measuring tubes at positions corresponding to positions of sensor carriers in a completed tuning fork.

This stabilized tuning fork pre-stage can now be used to proceed with a brazing process for attaching additional components of a tuning fork principally in the same way as in the prior art. The only difference as compared to prior art processes resides in the fact that a much less complicated brazing tool can be used to fix the additional components to be attached since there is no need to stabilize the measuring tubes and to fix the carriers for the sensors and driver units. The additional components may be selected, for example, from at least one of a node plate, a flow combiner and a flow divider.

After having finished the brazing process the bracket parts are severed so as to form two separate breaking part portions per bracket part. Severing is carried out in a region between said first and second measuring tube such that a gap is formed between the bracket part portions. That is, there is a distance between the bracket part portion attached to a first one of the measuring tubes and the opposing bracket part portion attached to a second one of the measuring tubes. In a preferred embodiment of the invention, this gap is purposefully adjusted in order to limit the vibration amplitude of the measuring tubes during normal use of the Coriolis mass flowmeter. The opposing faces of the bracket part portions which have been formed by the severing step work as stops which prevent further lateral oscillating movement of the measuring tubes. The maximum oscillation amplitude can thus be limited by selectively adjusting the distance between the opposing faces of the bracket part portions, i.e., the width of the gap formed during the severing step.

In the method of the present invention, the steps of fixing the bracket parts on the measuring tubes, fixing at least one additional part of the tuning fork to the bracketed measuring tubes and severing the bracket parts are always carried out in this order. On the other hand, the order of fixing the first and second bracket parts on the measuring tubes is of no importance. It plays no role at all whether the first bracket part which is to carry the driver units is fixed before or after the second bracket part which is to carry the sensors. While normally only one driver unit is used per measuring tube usually at least two sensors per tube are utilized. It is accordingly preferred in the present invention to use as many second bracket parts as there are sensors per measuring tube in the completed tuning fork. After the brazing process, the bracket parts may then be severed in any desired order.

Any suitable method for severing the bracket parts and forming the gaps between opposing faces of the thus formed bracket part portions can be used. Preferred methods are mechanical cutting and laser cutting. Finally, conventional sensors and driver units can be attached to the bracket part portions in any suitable way in order to result in the completed tuning fork. A preferred tuning fork contains one driver unit and two sensors per measuring tube, all attached to a respective one of a bracket part portion. A tuning fork obtained by the method of the present invention is also an object of the present application. A further aspect is a Coriolis mass flowmeter utilizing a thus obtained tuning fork. Apart from the bracket part portions described herein the tuning fork and the Coriolis mass flowmeter utilizing same principally corresponds to the tuning forks and Coriolis mass flowmeters already known from the prior art. Reference can be made in this regard to the publications mentioned in the background portion of this application whose content is incorporated herein by reference.

BRIEF DESCRIPTION OF THE DRAWINGS

The invention shall be described in more detail with reference to the accompanying drawings. The drawings, which are merely schematic, are only illustrative of preferred embodiments but not intended to restrict the invention to the specific examples. In the drawings.

DETAILED DESCRIPTION

Figure 1:
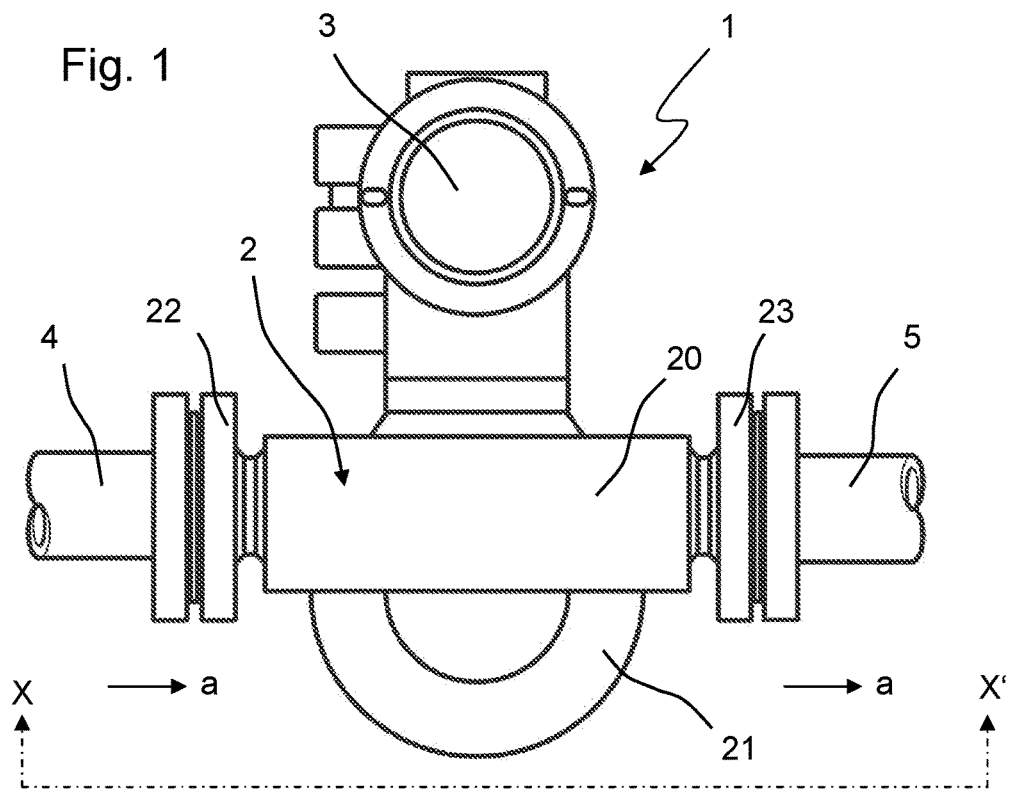
FIG. 1 shows a perspective view of a Coriolis mass flowmeter in accordance with the invention.

FIG. 1 shows an exemplary embodiment of a Coriolis mass flowmeter in accordance with the present invention. The Coriolis mass flowmeter 1 is comprised of a measurement casing 2 to which a tube casing 21 is connected. The Coriolis mass flowmeter 1—in the following also denoted as a flowmeter only-additionally comprises a transmitter casing 3 containing measurement electronics, display means and the like. The flowmeter 1, in a per se known manner, is arranged in a tube system between an inlet pipe 4 and an outlet pipe 5 to which it is connected via an inlet flange connection 22 and an outlet flange connection 23, respectively. The fluid, such as a gas or a liquid, which is guided through the pipes 4 and 5 enters the Coriolis mass flowmeter 1 on the left side in FIG. 1 and exits on the right side as indicated by the arrows a.

Figure 2:
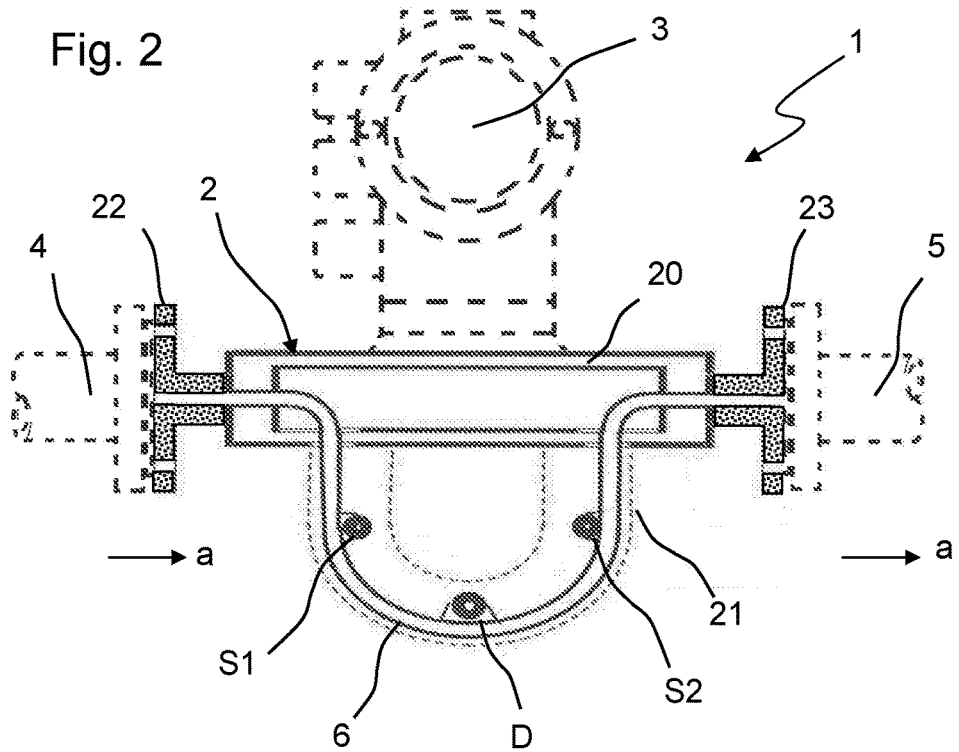
FIG. 2 shows a cross-sectional view on plane X-X' in FIG. 1.

As can be taken from FIG. 2, the fluid, after having entered the flowmeter at inlet flange connection 22, is guided through a U-shaped measuring tube 6 which is arranged inside the tube casing 21. The flowmeter of this embodiment is of a double-tube type. That is, a second U-shaped measuring tube 6' corresponding to the measuring tube 6 is arranged in parallel behind measuring tube 6 but concealed in the view shown in FIG. 2. The mass flow rate of the fluid passing through the flowmeter 1 is determined by measuring the vibration pattern of the measuring tubes, as principally known in the art. For this purpose, a driver unit D and two sensors S1 and S2 are connected to the measuring tube 6. The same arrangement of driver unit D' and two sensors S1' and S1' is provided at the second measuring tube 6' (compare FIG. 3).

Figure 3:
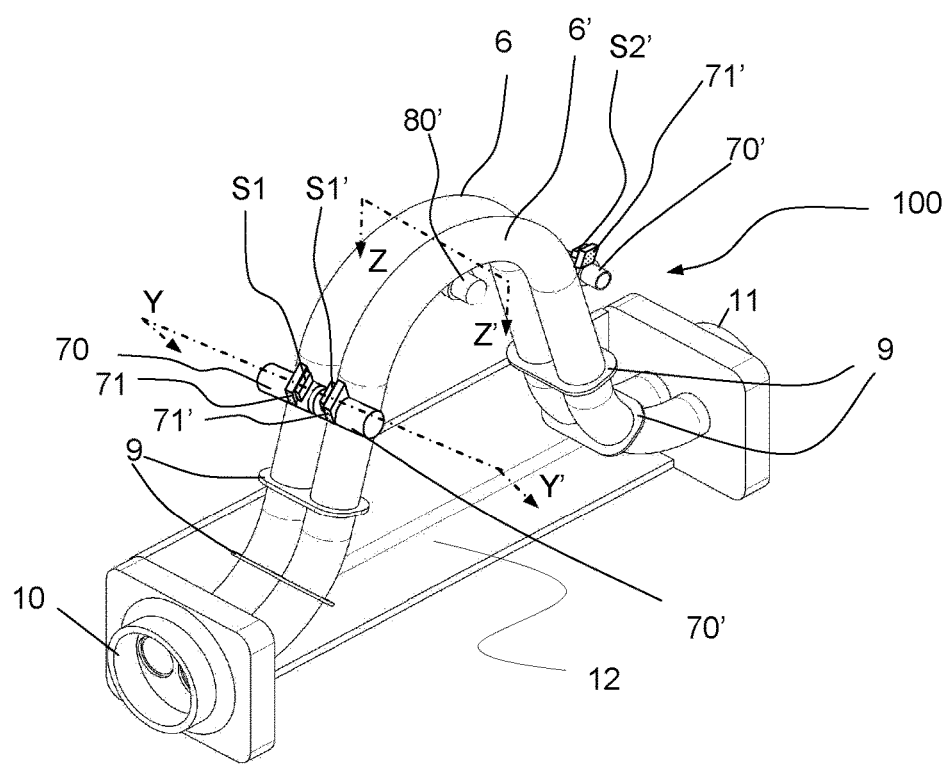
FIG. 3 shows a perspective view of a tuning fork in accordance with an embodiment of the invention.

FIG. 3 shows an exemplary embodiment of a tuning fork 100 in accordance with the present invention. The tuning fork is comprised of two measuring tubes 6, 6' to which two pairs of sensors S1, S1', S2, S2' are fixed by means of carriers 70, 70'. The carriers can have a rod-shaped basis, as shown, a bar-shaped basis, or the like consisting of the same metal as the measuring tubes and welded thereto. A protrusion 71, 71' is formed in one piece with the basis. The sensors S1, S1' and S2, S1' are fixed to a respective one of the protrusions 71, 71'. At the apex of each of the measuring tubes 6, 6' a further carrier is fixed which corresponds to the carriers 70, 70' and which holds a driver unit. In FIG. 3, only an outer end of one carrier 80' can be seen, the remaining parts are hidden from view by the measuring tubes.

The ends of the measuring tubes 6, 6' are attached to a flow divider 10 at the inlet side and, respectively, by a flow combiner 11 at the outlet side. The flow divider 10 and the flow combiner 11 are additionally fixed to a frame 12. Node plates 9 are additionally provided in order to stabilize the measuring tubes 6, 6', as principally known in the art. The flow divider 10, the flow combiner 11 and the node plates 9 are fixed to the measuring tubes 6, 6' by brazing. Optionally, the carriers 70, 70' for the sensors and the carriers for the driver units can also be brazed to the measuring tubes in addition to the initial welding fixture.

Figure 6:
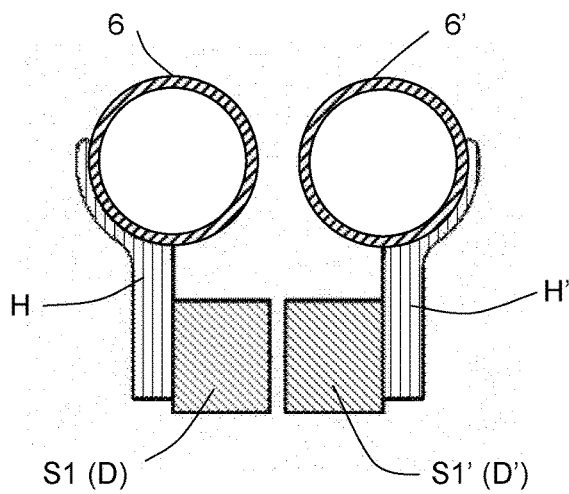
FIG. 6 shows a cross-sectional view of a prior art tuning fork.

In the prior art brazing processes, each of the components of the tuning fork had to be held in place separately resulting in the need of a very complicated brazing tool. Additionally, separate carriers for each of the sensors and driver units had to be fixed to the measuring tubes by brazing steps. This situation is schematically shown in FIG. 6 which is a cross-sectional view through parallel measuring tubes in a position where a carrier for a sensor S1 and, respectively, S1' is located. The same situation arises when the cross-section is taken at locations where driver units D, D' are fixed oppositely to each other on measuring tubes 6, 6'. FIG. 6 will be described with respect to a pair of sensors S1, S1' but the same applies for a pair of sensors S2, S2' and a pair of driver units D, D'. As can be seen in FIG. 6, each of the measuring tubes 6, 6' is provided with a holder H, H' essentially in the form of an arm whose hand partly encloses the outer tube surface. Each of the holders H, H' is attached to the respective measuring tube 6, 6' by brazing and, during the brazing process, has to be held in place separately. The brazing tool is removed after brazing. The sensors S1, S1' are attached to the arms after the brazing process is finished.

Figure 4:
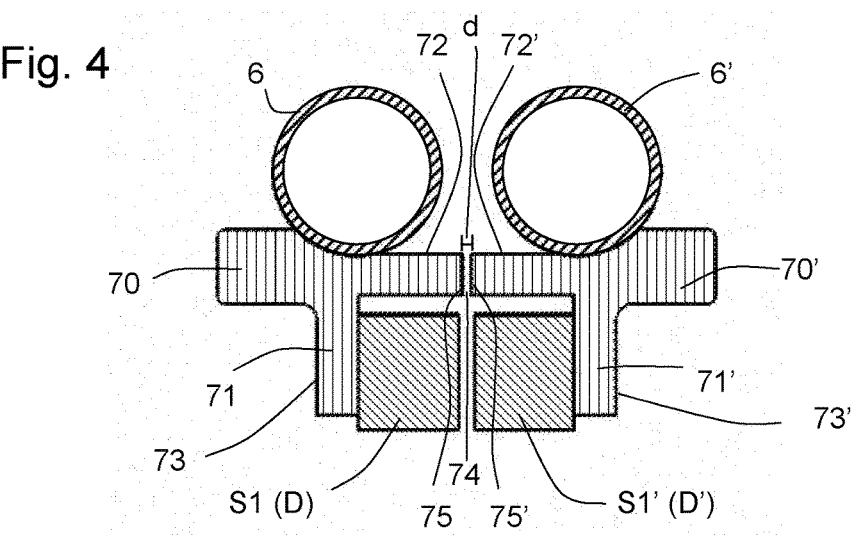
FIG. 4 shows a cross-sectional view along line Y-Y' or Z-Z' in FIG. 3.
Figure 5:
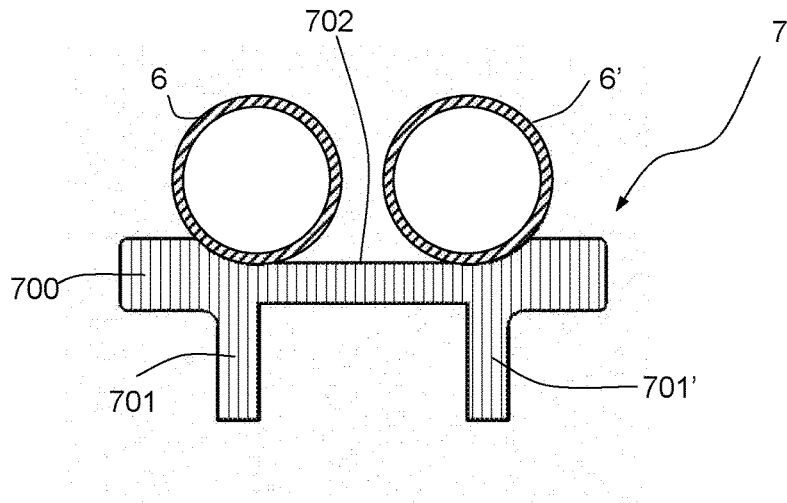
FIG. 5 shows a cross-sectional view of a tuning fork pre-stage corresponding to FIG. 4.

In the method of assembling a tuning fork of the present invention, no separate carriers for the sensor pairs and, respectively, pair of driver units are needed. By contrast, bracket parts 7 are used as exemplary shown in FIG. 5. The bracket part 7 is in the form of a bridge which joins the measuring tubes 6, 6' at positions where a sensor or a driver unit will be located in the completed tuning fork. The bracket part 7 consists of the same material as the measuring tubes which will normally be a metal, particularly steel. Due to the identical coefficients of thermal expansion, no distortions will occur when the bracket part and the measuring tubes are heated during the brazing process. The bracket part 7 may have any suitable form which can bridge the gap between the measuring tubes. In the present case, the bracket part 7 is formed with a bar-shaped or a rod-shaped basis from which two protrusions 701, 701' extend away from a respective one of the measuring tubes. In the completed tuning fork 100, the protrusions serve as carriers for the sensors and, respectively driver units which are attached at the inner sides of the protrusions, as shown in FIG. 3 and FIG. 4. The outer surfaces 73, 73' provide additional fastening surfaces to which other components of the tuning fork may be attached. On the side of the basis 700 facing the measuring tubes 6, 6', a depression 702 is provided. The curvature of the outer edge of the depression 702 corresponds to the curvature of the outer surfaces of the measuring tubes so that the measuring tubes can nestle against the edge of the depression. The measuring tubes 6, 6' are attached to the bracket part 7 by welding. In this regard, it may be sufficient to only spot-weld the measuring tubes to the bracket part and to provide an additional brazing connection in the following brazing process. The combination of the measuring tubes 6, 6' to which the bracket parts 7 have been fixed is called a tuning fork pre-stage of the present invention.

In the process of assembling a tuning fork 100 as shown in FIG. 3, three bracket parts 7 are attached to the measuring tubes 6, 6' at the later positions of the sensor pairs S1, S1' and S2, S2', respectively, and the driver units D, D'. The three bracket parts 7 hold the measuring tubes 6, 6' securely in position to each other so that no additional fixation is needed for the brazing process in which the remaining parts of the tuning fork are fixed to the measuring tubes. In the present case, the additional parts are node plates 9, the flow divider 10 and the flow combiner 11. It is also advantageous over the prior art processes that only three bracket parts 7 have to be fixed to the measuring tubes instead of six separate carriers which would have been needed in the prior art for the sensors and driver units. Contrary to the prior art processes, the bracket parts 7 used as fixations during the brazing process remain in the final tuning fork where, after having been severed, they are used as carriers for the sensors and driver units.

The brazing process may be performed as principally known from the prior art. After the additional parts of the tuning fork have been attached to the tuning fork pre-form the bridge part of the bracket parts 7 is severed in a region between the measuring tubes 6, 6'. This can be done in any suitable way, such as by cutting or laser cutting. The severing step is carried out such that a gap 74 is formed between the two bracket part portions 70, 70' which are formed from the bracket part 7. A measuring tube 6 and, respectively, 6' is attached at the edge of a respective one of the depression parts 72, 72'. The result of the severing step is shown in FIG. 4. Two essentially T-shaped carriers 70, 70' are formed with protrusions 71, 71' corresponding to the protrusions 701, 701' of the undivided bracket part 7. A sensor S1, S1' (or S2, S1' in case of the second sensor pair, not shown) and, respectively, a driver unit D, D' is then fixed to a respective one of the protrusions. In a preferred embodiment, the severing step is carried out such that a gap having a specific width d is formed. The width d is expediently selected such that the opposing faces 75, 75' act as stops which limit the vibration amplitude of the measuring tubes 6, 6' during normal operation of the tuning fork of the invention which is used in a Coriolis mass flowmeter of the invention.

The foregoing description of the invention has been presented for the purpose of illustration. It is not intended to be exhaustive or to limit the invention to the precise form disclosed, and obviously, many modifications and variations are possible. Such variations and modifications that may be apparent to a person skilled in the art are intended to be included within the scope of the present invention as defined by the accompanying claims.

What is claimed is:

1. A method of assembling a tuning fork of a Coriolis mass flowmeter, the completed tuning fork comprising:
   a first and a second measuring tube running at least partly essentially parallel to each other;
   a driver holder per measuring tube which is attached to a respective one of the measuring tubes and which is adapted to hold a driver unit in a position suitable to induce oscillation of the respective measuring tube;
   at least one sensor holder per measuring tube which is attached to a respective one of the measuring tubes and which is adapted to hold a sensor in a position suitable to detect oscillation of the respective measuring tube;
   the method comprising the steps of:
      providing a first bracket part and fixing it to opposing portions of said first and second measuring tube such that said bracket part forms a bridge between said measuring tubes at positions corresponding to the positions of said driver holders in the completed tuning fork;
      providing at least one second bracket part and fixing it to opposing portions of said first and second measuring tube such that said second bracket part forms a bridge between said measuring tubes at positions corresponding to the positions of said sensor holders in the completed tuning fork;
      fixing at least one additional part of the tuning fork to the bracketed measuring tubes;
      severing said first bracket part and forming a gap in a region between said first and second measuring tube; and
      severing said second bracket part and forming a gap in a region between said first and second measuring tube.

2. The method of claim 1, wherein said fixing of the first and second bracket part to said measuring tubes comprises a welding step.

3. The method of claim 1, wherein the first and second bracket parts are made from the same material as the measuring tubes.

4. The method of claim 1, wherein the first and second bracket parts are made from metal.

5. The method of claim 4, wherein the first and second bracket parts are made from steel.

6. The method of claim 1, wherein said fixing of at least one additional part comprises fixing of at least one of a node plate, a flow combiner, and a flow divider.

7. The method of claim 6, wherein said fixing comprises a brazing step.

8. The method of claim 7, wherein said severing steps are carried out after said brazing step.

9. The method of claim 1, wherein said severing steps comprise at least one of cutting and laser cutting.

10. The method of claim 1, wherein, in said severing step, said gap is provided such that a distance between severed bracket part portions is suited to limit a vibration amplitude of said measuring tubes during operation of the Coriolis mass flowmeter.

11. The method of claim 1, wherein at least one of said first and second bracket parts is provided with at least one fastening portion for fastening at least one additional component of the tuning fork.

12. A tuning fork pre-stage, comprising:
   a first and a second measuring tube running at least partly essentially parallel to each other;
   a first bracket part which is fixed to opposing portions of said first and second measuring tube such that said bracket part forms a bridge between said measuring tubes at positions corresponding to positions of drive unit carriers in a completed tuning fork; and
   at least one second bracket part which is fixed to opposing portions of said first and second measuring tube such that said second bracket part forms a bridge between said measuring tubes at positions corresponding to positions of sensor carriers in a completed tuning fork.

13. The tuning fork pre-stage of claim 12, wherein said bracket parts are made from the same material as the measuring tubes.

14. The tuning fork pre-stage of claim 12, wherein said bracket parts are made from metal.

15. The tuning fork pre-stage of claim 14, wherein said bracket parts are made from steel.

16. The tuning fork pre-stage of claim 12, wherein said bracket parts are fixed to the measuring tubes by welding.

17. The tuning fork pre-stage of claim 12, wherein at least one of said bracket parts is provided with a fastening portion for fastening a component of a tuning fork.

18. The tuning fork for a Coriolis mass flowmeter, comprising a tuning fork pre-stage of claim 12 wherein the first and second bracket parts are severed forming a gap in a region between said measuring tubes.

19. The tuning fork of claim 18, wherein the bracket parts and the measuring tubes are made of the same material.

20. The tuning fork of claim 18, wherein a driver unit is fastened to each of the severed first bracket parts.

21. The tuning fork of claim 18, wherein a sensor is fastened to each portion of the severed second bracket parts.

22. The tuning fork of claim 21, wherein two severed bracket parts are provided, each having a pair of opposing bracket part portions to which a respective sensor is fastened.

23. A coriolis mass flowmeter, comprising the tuning fork of claim 18.

* * * * *